Sept. 24, 1968 R. N. BORRELLI ETAL 3,402,867
PUNCHING SYSTEM
Original Filed Jan. 17, 1964 8 Sheets-Sheet 1

INVENTORS:
RONALD N. BORRELLI
RICHARD A. EDWARDS
CHARLES A. LINDBERG
HARRY F. NOLLER
ROBERT I. STITT
JAMES R. WILSON, JR.

BY *Clarence W. Martin*
AGENT

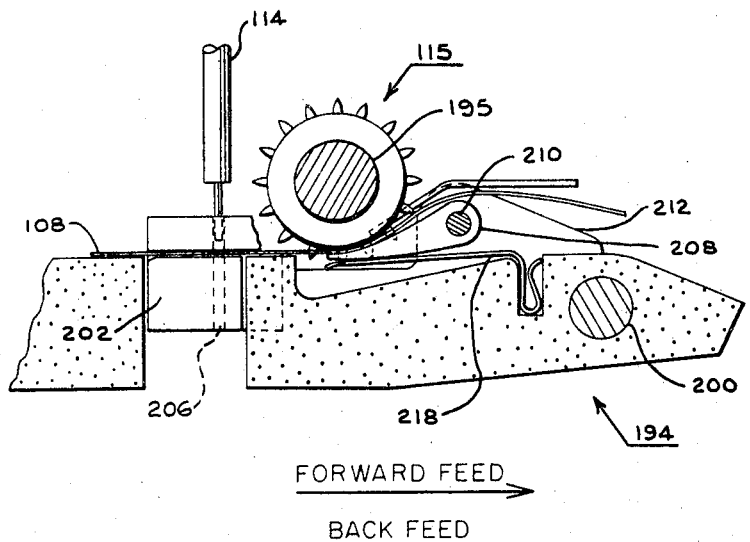
FIG-1A-
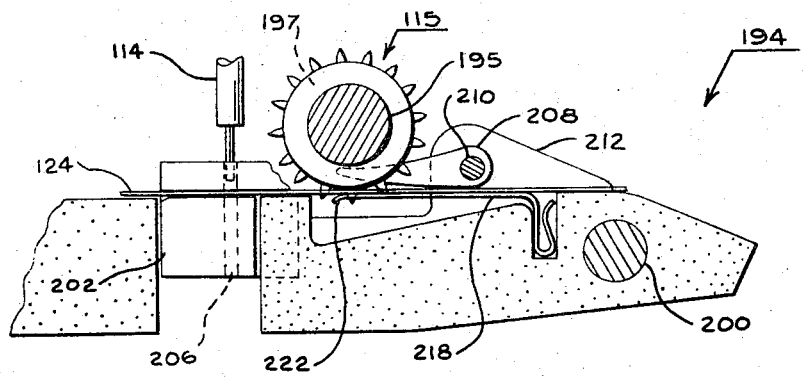
FIG-2A-

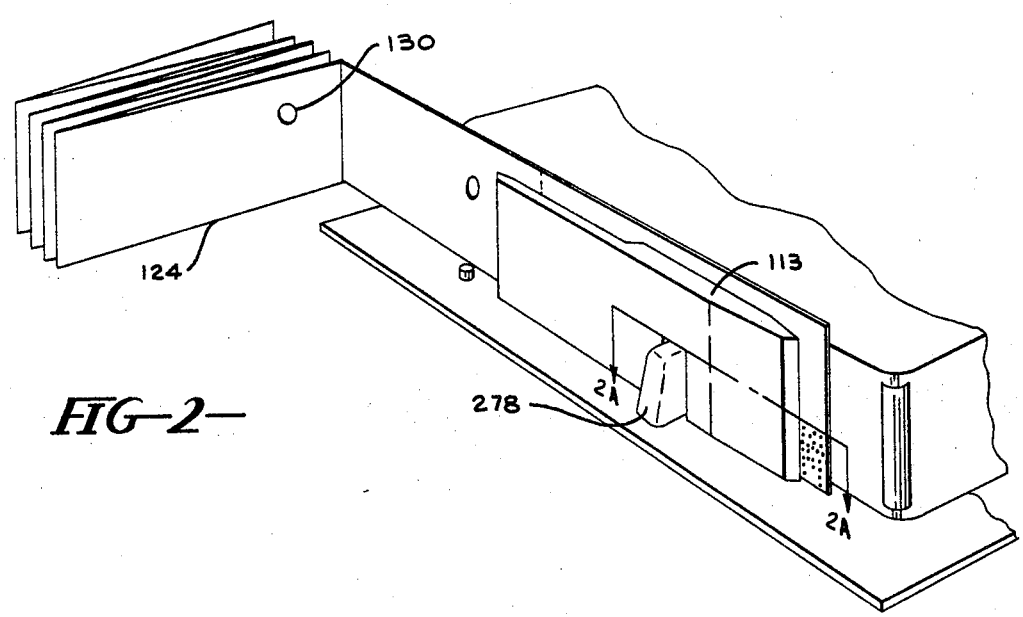
FIG-2-
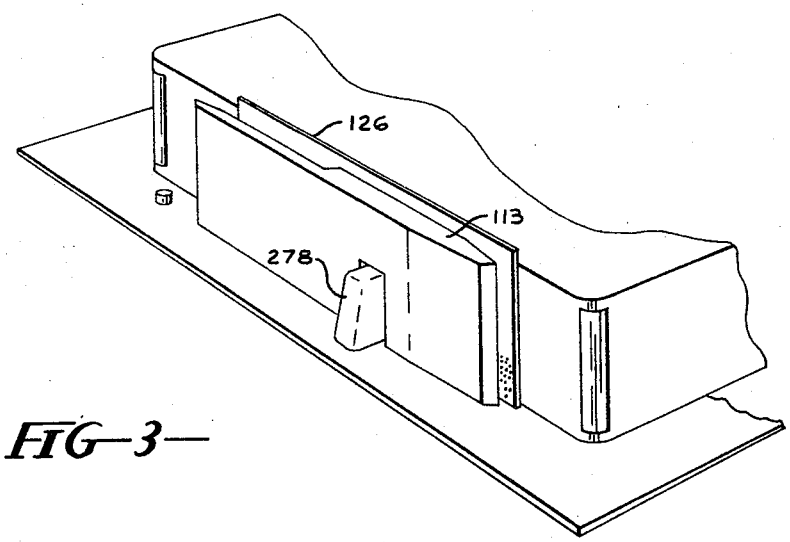
FIG-3-

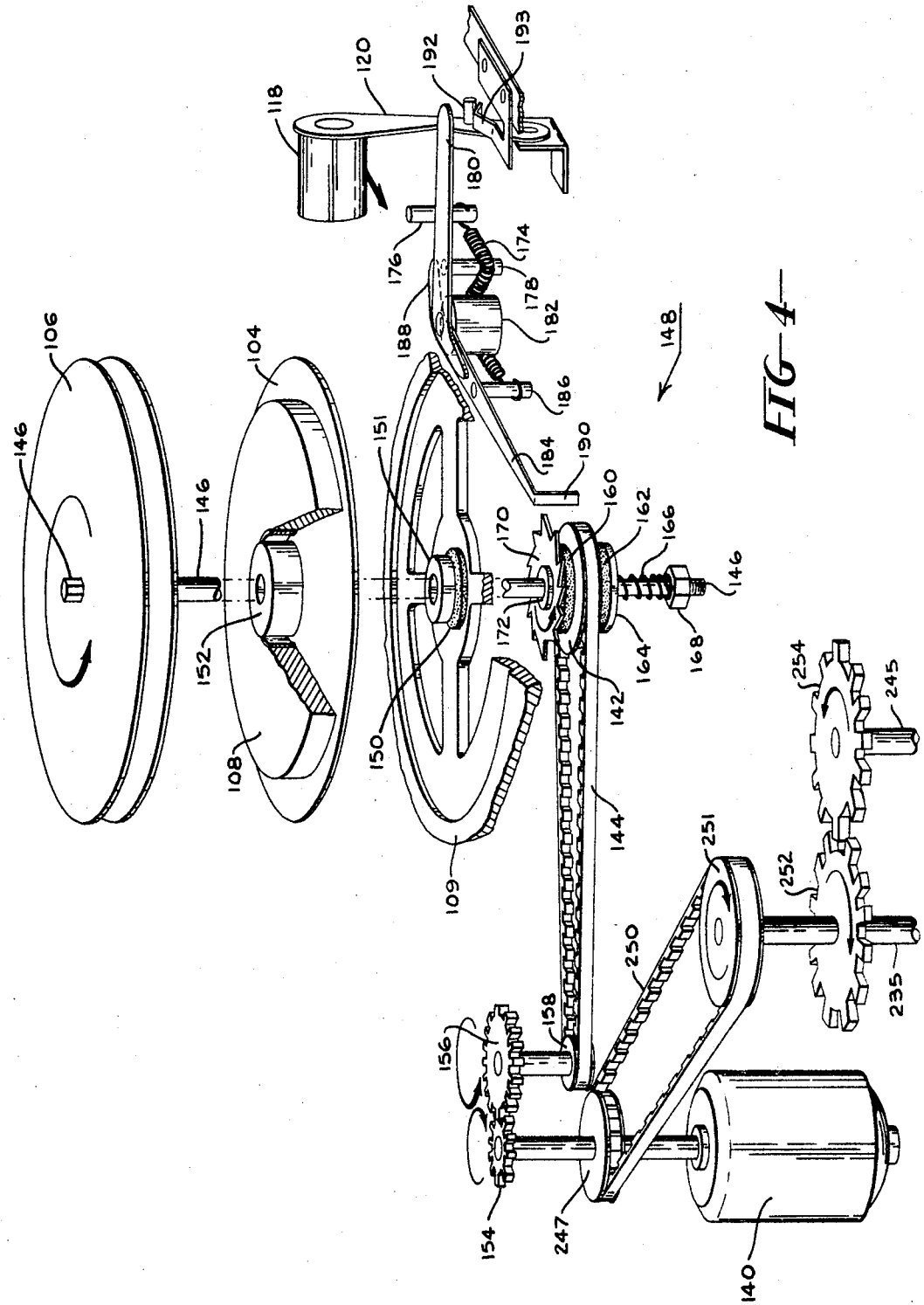

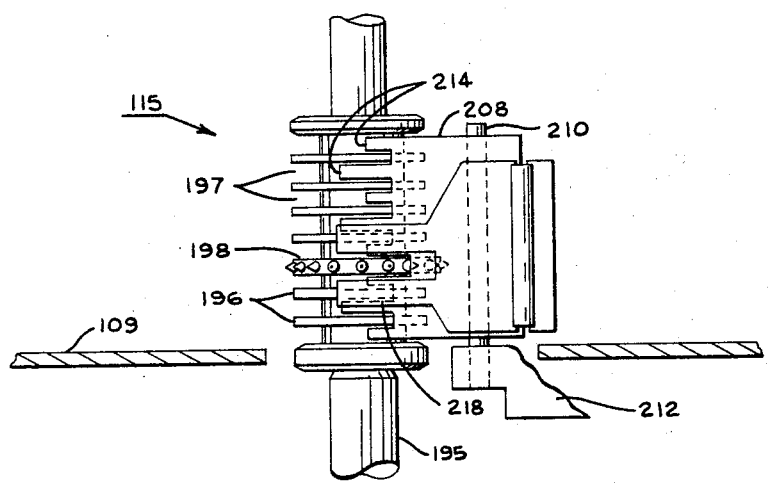
FIG-5-
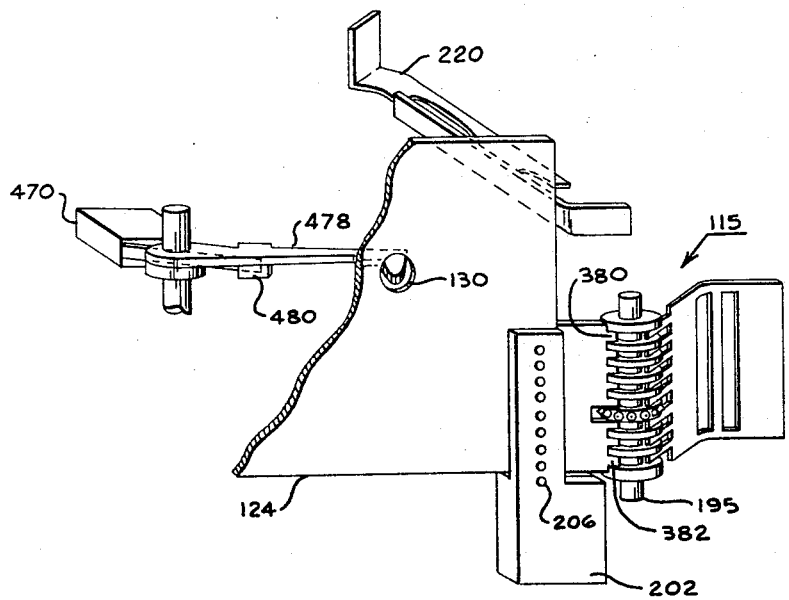
FIG-6-

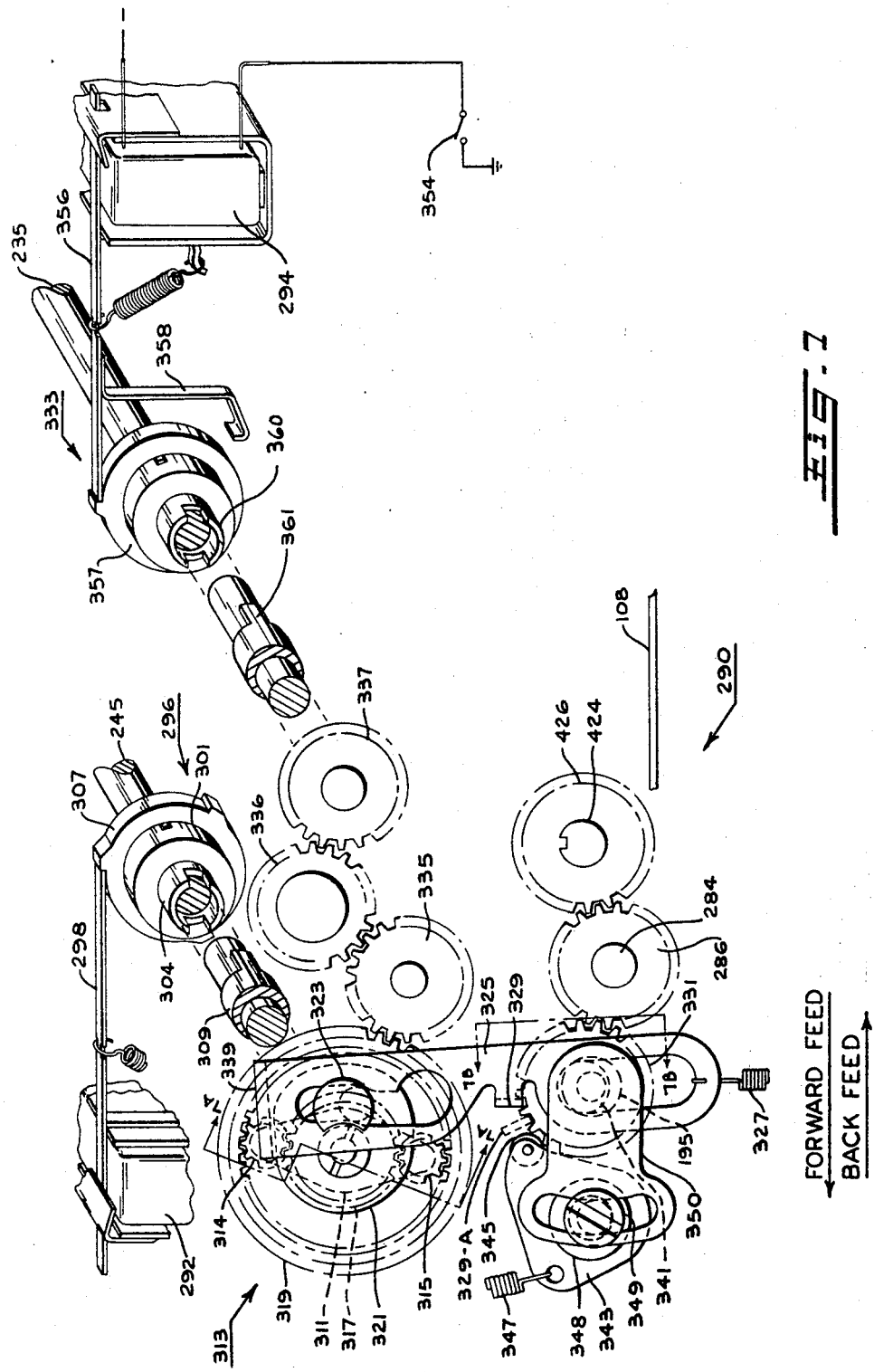

Sept. 24, 1968    R. N. BORRELLI ET AL    3,402,867
PUNCHING SYSTEM

Original Filed Jan. 17, 1964    8 Sheets-Sheet 7

United States Patent Office 3,402,867
Patented Sept. 24, 1968

3,402,867
PUNCHING SYSTEM
Ronald N. Borrelli, Moraga, Richard A. Edwards, Walnut Creek, Charles A. Lindberg, Menlo Park, Harry F. Noller, Moraga, Robert I. Stitt, Mountain View, and James R. Wilson, Jr., Berkeley, Calif., assignors, by mesne assignments, to Control Data Corporation, a corporation of Minnesota
Original application Jan. 17, 1964, Ser. No. 338,359, now Patent No. 3,301,477, dated Jan. 31, 1967. Divided and this application Sept. 29, 1966, Ser. No. 583,147
15 Claims. (Cl. 226—76)

ABSTRACT OF THE DISCLOSURE

A mechanism is disclosed for advancing tape, individual cards, or fanfold cards through a punching station. Control means operates for reverse feed of the tape. Selectively operable guide means coacts with the sprocket to drive tape but is inactive for card feed. Indexing means coacts with clutch control structure for the feeding operation. Sprocket drive means is located in offset relation with the sprocket holes and guide structure for proper feeding.

---

This application is a division of the patent, application Ser. No. 338,359, filed Jan. 17, 1964, since matured into Patent No. 3,301,477, issued Jan. 31, 1967.

The invention relates to punching systems in which media may be perforated according to coded data received from a data source, and more particularly, the invention pertains to a high-speed asynchronous punching system for punching tape, single cards, and fanfold cards.

Punching systems are used primarily in conjuction with data processing systems for punching coded holes in a media in response to data in the form of electrical impulses transmitted thereto from a data processing system. Such data processing systems generally are capable of producing data at rates which exceed the highest operating speeds of known punching systems. Consequently, a continual effort is being made to arrange punching systems for operation at higher speeds. Some considerations in obtaining higher operating speeds include reducing the number of parts to eliminate waste of time and power in starting and stopping masses of materials, using an arrangement in which the components are as small as possible to further reduce the mass to be moved, and using an arrangement of parts that require a minimum of movement to produce the desired result. In achieving the aforementioned considerations, it is desirable, in addition, to arrange a system that is reliable and easily adjusted in accordance with modern standards of quality and serviceability. Another consideration is to arrange a punching system having that ability to punch cards as well as tape, such versatility enabling the system to punch media for use with the various types of data processing systems available. Still other considerations include arranging a system that is in physical proportion to the modern data processing systems with which the punching system normally is operated, i.e. it is desirable that the system be as compact as possible. In order that such devices may be manufactured as articles of commerce, it is necessary that all of the considerations mentioned be achieved at a low cost by means of an arrangement that is inherently inexpensive.

A main object is to provide a simplified means for controlling a tape takeup reel.

Another object is to provide a tape system having control means that is responsive to tape tension for controlling the speed of a tape takeup reel.

Another object is to provide a punching system that is easily adjusted.

Another object is to provide an improved feed mechanism requiring only simplified adjustment for smooth operation.

Another object is to arrange a feed mechanism comprising a driving member, a gear and a combined pivot and adjustment means for the driving member so as to permit fine adjustment of the driving member with respect to the gear.

Another object is to arrange a punching system that feeds either tape or cards for perforation by the system.

Another object is to provide a gate having no moving parts for guiding tape in arcuate engagement with a sprocket and guiding cards in tangential engagement with the sprocket.

Another object is to minimize the number, size and complexity of parts and components in a punching system in order that such a system may be manufactured at a low cost.

Another object is to provide means for feeding card media from an index position to a position for engagement with normal feed means.

Another object is to provide a forward feed key for actuation of mechanism for continuously feeding tape as long as the key is held depressed and for automatically feeding cards upon momentary depression of the key.

Another object is to lower a sprocket with respect to a reference surface so as to force media engaged with the sprocket into engagement with the surface, thereby maintaining holes punched in the media in alignment with a punching station.

Other objects and advantages will appear in the following description, given by way of example only, in which:

FIG. 1A is a sectional view taken along lines 1A—1A of FIG. 1 showing the relationship between a gate, a driving sprocket, a punching station, and tape media.

FIG. 2 is a perspective view of a portion of the punching system of FIG. 1 shown operating with fanfold card media.

FIG. 2A is a sectional view taken along line 2A—2A of FIG. 2 showing the relationship between the gate, the sprocket, the punching station and card media.

FIG. 3 is a perspective view of the punching system of FIG. 1 shown operating with a single card.

FIG. 4 is a front perspective view on a reduced scale showing mechanism for driving and controlling a tape takeup reel.

FIG. 5 is an enlarged front view of the drive sprocket showing the relationship of a tape guide and pressure spring carried by the gate with respect to the sprocket.

FIG. 6 is an enlarged front perspective view of a portion of the system showing a card positioned by index means in an index position with respect to the punching station and the sprocket.

FIG. 7 is an enlarged bottom view of a feed mechanism partially in plan and partially in perspective.

General description

Figure 1:
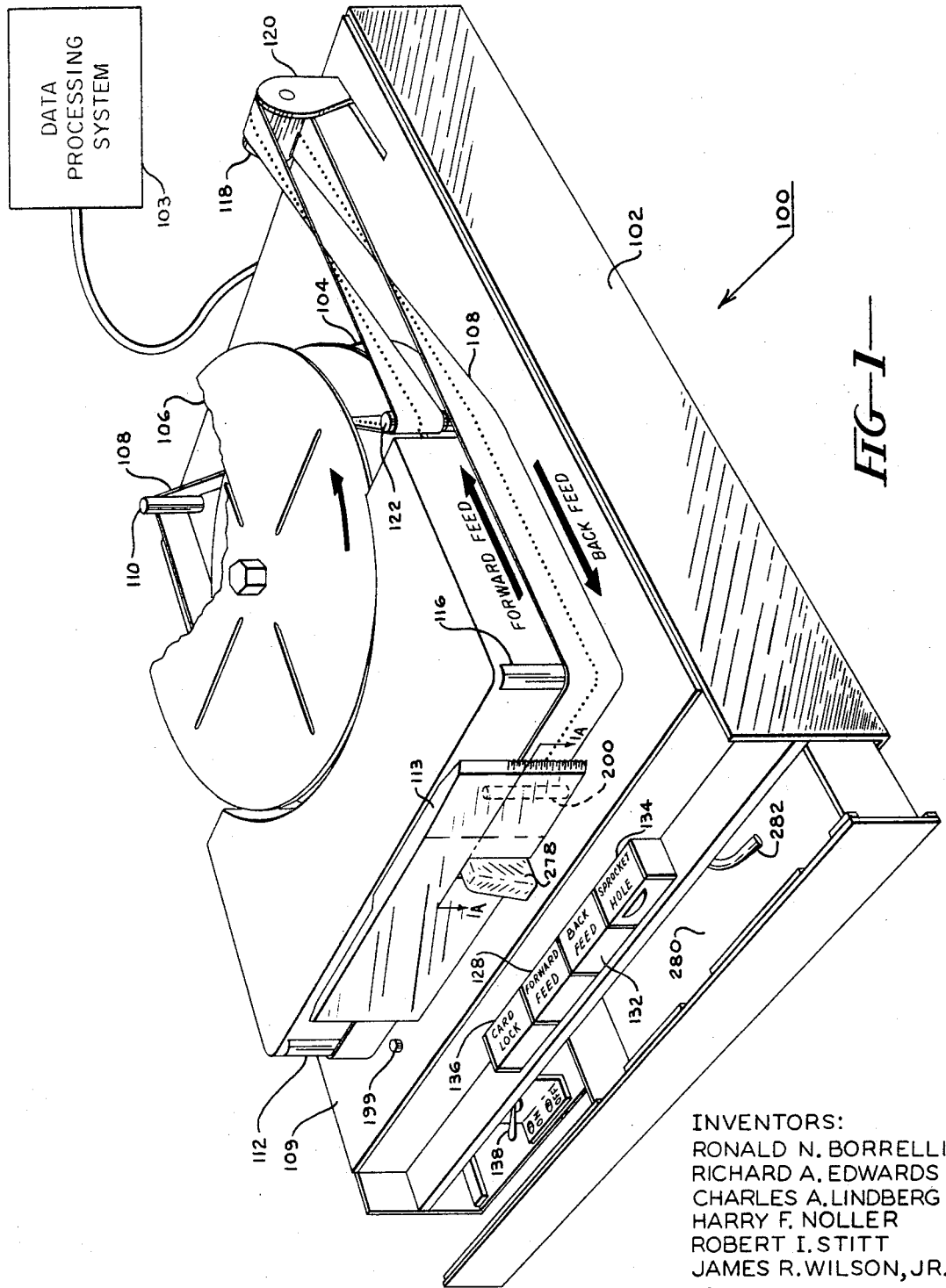
FIG. 1 is a perspective view of a punching system shown for operation with tape media.

The present invention is shown embodied as a punching system 100 in FIG. 1, which system is assembled into a cabinet 102. The system 100 may be connected to a data source such as a Data Processing System 103 for receiving data therefrom for punching code holes in tape or card media.

A supply reel 104 and a take-up reel 106 are shown in position on the cabinet with the supply reel beneath the take-up reel. The supply reel is loaded with a paper tape media 108 which is guided from the supply reel 104 along a cabinet deck 109 by means of tape guides 110 and 112 through a gate 113 to a punching station comprising vertically arranged punches 114 (FIG. 1A) for punching coded holes in the tape. The tape is driven towards the take-up reel by means of a sprocket 115, the take-up reel being driven to take up the tape. The tape 108 is guided from the gate 113 over a guide 116, a roller 118 mounted on a tape elevator arm 120 and then around a tape guide 122 to the take-up reel 106. The roller 118 is of such a diameter as to raise the tape from the level of the supply reel to the level of the take-up reel. Alternatively, fanfold cards 124 (FIG. 2) or single cards 126 (FIG. 3) may be fed through the gate, instead of a tape 108, for punching along the edge of the card.

Four control keys are provided at the front of the cabinet 102 (FIG. 1) for control of various functions of the punch. A forward feed key 128 is provided for control of forward feeding either tape or card media without punching information holes in the media. With tape media inserted into the machine, depression of the feed key 128 causes the tape to be fed as long as the key is held depressed. With fanfold card media inserted into the machine, the media is fed without punching information holes as long as the key 128 is held depressed. In addition, however, momentary depression of the feed key 128 causes automatic forward feeding of fanfold cards until the next card is driven to an index position where a hole 130 is detected to cause the feeding to stop. In the case of a single card, the card will forward feed automatically upon momentary depression of key 128 until the trailing end of the card is sensed.

A back feed key 132 is provided for back spacing either card or tape media one code space for each depression of the key.

A sprocket hole key 134 is a two position key that is provided for controlling punching of a sprocket hole in either the tape or card media. With the key 134 depressed, a sprocket hole punch is activated to punch a sprocket hole whenever the media is fed forward. With the key 134 raised, no sprocket hole is punched.

A card lock key 136 is provided for controlling the advance of either a single card or the first card of a series of fanfold cards from an index position to a position of engagement of the card sprocket holes with the sprocket 115. Initially, each single card or the first card of a series of fanfold cards manually is inserted in the gate 113 in the index position. Depression of the card lock key 136 causes automatic engagement of a pair of pinch rollers with the card for driving the card until the card is far enough rightward for engagement of the sprocket holes with the sprocket.

An on-off toggle switch 138 is provided beneath the front of the cabinet for control of power to a drive motor 140 (FIG. 4). With the motor energized, a pulley 142 is continuously driven by means of a belt 144 and a gearing arrangement connected to the motor shaft. The continuously rotated gear 142 is provided for driving a shaft 146 to which the take-up reel 106 is connected. The shaft and reel are driven intermittently through a clutch assembly 148 that is responsive to tape tension. The supply reel 104 is freely mounted on the shaft 146 and rides on a felt washer 150 located between the bottom plate of the reel 104 and the cabinet 102. The felt washer is mounted around a hub 151 that extends upwardly from the cabinet deck 109 and provides a slight drag on the supply reel when the tape 108 is pulled therefrom. The drag prevents excessive unwinding of the tape when the tape is driven forward, yet is light enough to prevent breaking or tearing of the tape.

Tape reels

The manner in which the supply reel 104 and the take-up reel 106 are stacked on the cabinet 102 and the means for driving the take-up reel are best shown in an expanded view in FIG. 4. The supply reel 104 comprises a single lower plate having a recessed hub 152 integral therewith which is freely mounted on the shaft 146. A roll of the paper tape 108 fits over the hub 152. The hub 152 is arranged to receive the hub 151 that extends upwardly from the cabinet frame.

The take-up reel 106 comprises both an upper and lower plate which are releasably held together by suitable means not shown. A central hexagonal hole is formed in each of the plates of the take-up reel for receiving the upper end of the shaft 146 which is hexagonally formed for mating engagement with the holes. The lower plate of the take-up reel 106 rides on the hub 152 that extends upwardly from the supply reel 104. The hub 152 extends slightly above the roll of tape, providing clearance between the lower plate of the take-up reel and the tape 108 on the supply reel 104.

Upon movement of the on-off switch 138 (FIG. 1) to the "on" position, the motor 140 (FIG. 4) is energized for continuous rotation. With the motor rotating, the clutch assembly 148 continuously tends to drive the shaft 146 and the take-up reel 106 counterclockwise (CCW). Power is supplied to the pulley 142 from the motor by means of gears 154 and 156, pulley 158, and belt 144. The pulley 142 is freely mounted on the shaft 146 and is continuously driven CCW as long as the motor 140 remains "on." A pair of felt disks 160 and 162 are connected to the pulley 142 by conventional means not shown.

One means for connecting the disks to the pulley utilizes pins which extend through the pulley 142 into each of the disks 160 and 162 thereby driving the disks with the pulley. A metal disk 164 is slidably keyed to the shaft 146 for engagement with the lower felt disk 162. The metal disk 164 is urged into engagement with the felt disk 162 by means of a spring 166 that is held in place by a nut 168. A ratchet wheel 170 is mounted on the shaft 146 for engagement with the upper disk 160. The wheel 170 also is keyed to the shaft 146 but is prevented from movement upward by means of a retaining washer 172 lying against a shoulder of the shaft. The spring 166 forces the entire clutch assembly 148 together so that the felt disks 160 and 162 tend to drive the shaft 146 through engagement with the ratchet wheel 170 and metal disk 162 respectively. The take-up reel 106 is driven by the hexagonal end of shaft 146 at a speed which causes the take-up reel to rotate slightly faster than the maximum speed at which the tape 108 can be fed by the sprocket 115 (FIG. 1A). This causes the tape 108 (FIG. 1) that is between the take-up reel 106 and the sprocket 115 to become tight. Sufficient tightness in this length of tape creates a tension which tends to pull the roller 118 forward. The roller 118 is mounted on the arm 120 (FIG. 4) which is pivoted on the cabinet frame. The arm 120 and roller 118 are urged rearwardly by means of a spring 174 connected at respective ends to a post 176 extending from the cabinet frame and a post 186 extending downwardly from a lever 184, the spring exerting tension on a post 178 on arm 180 which is engaged with the control arm 120. The lever 180 is pivoted on an upwardly extending frame shaft 182 to which the pawl 184 also is pivoted. The spring 174 tends to pull the pawl 184 and lever 180 in opposite directions until an arm 188 of the pawl 184 engages the downward extending post 178 on the lever 180. The entire assembly is urged CCW thereby and the arm 120 and roller 118 rearward. When the length of the tape between the sprocket 115 and the roller 118 is pulled tight through rotation of the reel 106, the arm 120 is forced forward by the tape, driving the lever 180 and pawl 184 clockwise (CW) on the shaft 182. An ear 190 on the pawl 184 is provided for engagement with the teeth of the ratchet wheel 170. Whenever the tape is pulled sufficiently tight, the arm 120 and pawl 184 are rocked far enough for the ear 190 to engage the ratchet wheel teeth and thereby prevent further rotation of the shaft 146 and the take-up reel 106. During the period of engagement of the ear 190 with the ratchet teeth, the felt disks 160 and 162 slip with respect to the rachet wheel 170 and the metal disk 164. After sufficient tape 108 is fed by means of the sprocket, the tension in the tape is relieved, permitting the spring 174 to pull the lever 180 and pawl 184 CCW, disengaging the ear 190 from the ratchet 170 and rocking the arm 120 rearward. With the ratchet 170 free to rotate, the felt disks 160 and 162 drive the shaft 146 and take-up reel 106 until tension is again produced in the tape 108 sufficient to cause the pawl 184 to re-engage with the ratchet.

When the tape 108 is back-fed upon depression of the back feed key 132, consequent tension in the tape forces the pawl ear 190 into engagement with the ratchet 170, stopping rotation of the reel 106. The arm 120, however, is free to move further forward, expanding the spring 174, until a stud 192 on the arm 120 engages a detent spring 193 secured to the cabinet frame. The stud 192 is not detented over the spring 193 but is only stopped by it. The length of tape that may be back-fed may be adjusted by positioning the detent 193 with respect to the stud 192.

When the punch system 100 is used for punching cards, rotation of the takeup reel 106 may be stopped by manually pulling the arm 120 forward until the stud 192 detents over the spring 193. This forces the pawl 184 into engagement with the ratchet 170, stopping rotation of the shaft 146 and takeup reel 106. This causes the felt disks 160 and 162 to continuously slip with respect to the ratchet wheel 170 and the metal disk 164.

Gate assembly

A gate assembly 194 (FIGS. 1A and 2A) is provided for holding tape 108 (FIG. 1A) in arcuate engagement with the sprocket 115 or for holding either cards 124 (FIG. 2A) or 126 (FIG. 3) in tangential engagement with the sprocket. The sprocket 115 (FIG. 5) is an integral unit that is force fitted to a shaft 195 and comprises disks 196 with grooves 197 formed therebetween, and a toothed disk 198 with teeth extending therefrom for engagement with sprocket holes in the media.

Prior to insertion of the tape into the system 100, a detent release button 199 is depressed to release the gate 113 and gate assembly 194 from the position shown in FIG. 1 for movement forward. The gate is pivoted on the cabinet by means of a shaft 200 that is embedded in the gate and extends therefrom into a mating hole in the cabinet. The tape 108 is then inserted in a slot in a die block 202 (FIGS. 1A and 6). The die block 202 receives and guides the vertically aligned punches 114 in holes 206. With the gate 113 open the tape is placed in front of the sprocket 115 and then around the guide 116 (FIG. 1), the roller 118 and the guide 122 into the take-up reel 106. Upon closure of the gate 113 to the position shown in FIG. 1 where the gate is maintained by means of the detent (not shown), a tape pressure guide 208 (FIGS. 1A and 5) forces and hold the tape 108 against the sprocket 115 in arcuate engagement therewith.

The tape pressure guide 208 is carried on the gate 113 by means of a shaft 210, extending upwardly from an extension 212 of the gate located below the level of the deck 109. The guide 208 comprises fingers 214 extending therefrom for mating with the grooves 197 in the sprocket. A media pressure spring 218 is mounted in a cavity in the gate 113 in engagement with the guide 208, urging the guide CW (FIG. 1A). With the tape in place, the spring 218 forces the guide 208 against the tape 108 to firmly hold the tape in arcuate engagement with the sprocket disks 196 and 198.

Instead of tape 108, a card 124 may be engaged with the sprocket 115 by means of the gate assembly 194 as shown in FIG. 2A. When the card is placed in the system 100 the gate is in the closed position shown in FIG. 2; and the card is inserted in an index position as shown in FIG. 6, against a slide 220 which stands above, and does not interfere with, the tape. Upon depression of the card lock key 136 (FIG. 1), the slide 220 is forced clear of the card 126, by means hereinafter described. Then the card is engaged with a pair of pinch rollers, also discussed hereinafter. Upon receipt of data from the Data Processing System 103, the card 126 is fed by the pinch rollers until the card is moved far enough rightward to engage the sprocket 115, at which time the pinch rollers are disengaged from the card to enable the sprocket to thereafter feed the card. Prior to engagement of the card with the sprocket, the spring 218 forces the tape pressure guide 208 into the mating slots 197 (FIG. 5) in the sprocket 115 to the position shown in FIG. 2A. As the card 126 is driven rightward, the leading edge of the card engages a flared portion 222 of the spring 218, leaving the tape pressure guide 208 in the slots 197 while the spring 218 is moved outward by the card. The card thereafter is held by the spring 218 in tangential engagement with the sprocket disks 197 and 198.

A novel punch drive mechanism is disclosed in the previously mentioned application and comprises, in part, a spring clutch which is engaged upon energization of an appropriate solenoid. After the clutch has been driven the appropriate amount to effect the punching operation by means of clutch driven cams and followers, the clutch is automatically disengaged. The clutches for driving tape or card media in a forward or backward direction are similar to the above mentioned clutches for the punches, and reference may be had to the previously mentioned application, incorporated herein by reference thereto, for a more complete understanding of the specific clutching mechanism.

Feed mechanism

Figure 7A:
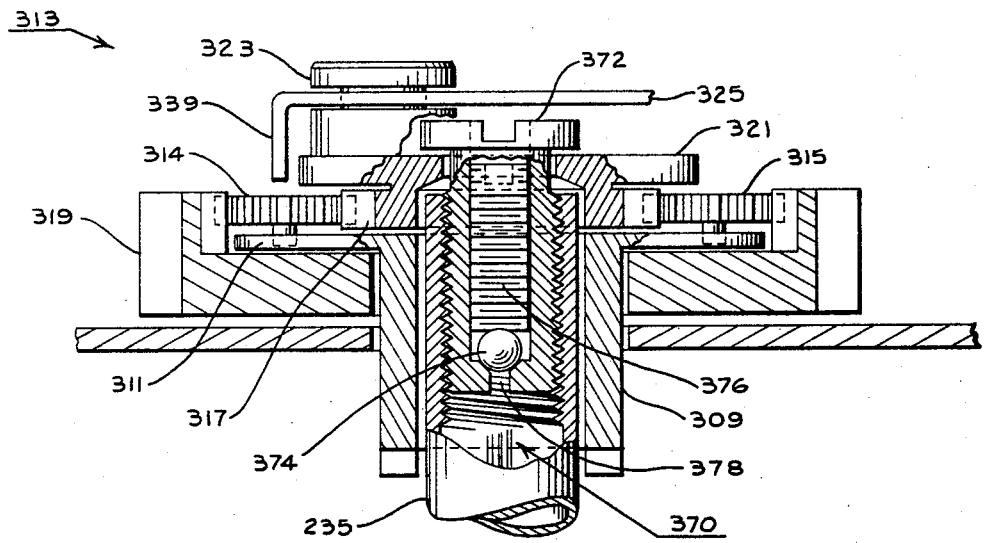
FIG. 7A is an enlarged sectional view taken along line 7A—7A in FIG. 7 illustrating a planetary gearing system for driving the feed mechanism and a novel fastening device for holding the planetary mechanism together.

A feed mechanism 290 (FIG. 7) is provided for driving the sprocket 115 (FIG. 1A) to feed card and tape media either forward or backward, FIG. 7 being a bottom view. Upon energization of a forward feed solenoid 292 (FIG. 7), by means described hereinafter, the sprocket 115 is driven by the feed mechanism one tooth space in the CCW (FIG. 1A) direction to feed the media one code space forward (toward the right as seen in FIG. 1A). Upon energization of a back feed solenoid 294 (FIG. 7) by means discussed hereinafter, the sprocket wheel 115 is driven one tooth space in the CW direction (FIG. 1A) to feed the media one code space backward or leftward.

A forward feed clutch 296 is mounted on the continuously rotated shaft 245 (FIG. 4) and normally is restrained from movement with the shaft by an armature 298 (FIG. 7) associated with the forward feed clutch 296 is identical in principle with that of the punch clutches (disclosed in the previously identified application). A ratchet wheel 307 has three teeth spaced 120° apart. The hub 304 is mounted on the shaft 245 and is formed with notches for receiving the forked ends of a bushing 309 also mounted on the shaft 245. The bushing 309 is integral with a planetary gear carrier 311 of a planetary gearing assembly 313. (See also FIG. 7.) The carrier 311 carries a pair of pivots for planet gears 314 and 315. The planet gears are in engagement both with a sun gear 317 and the internal teeth of a ring gear 319. Sun gear 317 is freely mounted on shaft 235 and the ring gear 319 is freely mounted on the bushing 309. Integral with the sun gear 317 is a cam 321 having a stud 323 extending therefrom into engagement with a slot in a driver 325. The driver is urged downward (FIG. 7) by a spring 327, normally holding an ear 329 on the driver in engagement with a tooth space of a gear 331 which is integral with the sprocket shaft 195 (FIGS. 1A and 5).

Upon energization of the forward feed solenoid 292 (FIG. 7) the forward feed clutch 296 is released for a one-third revolution CCW. The ring gear 319 has external teeth meshing with gear 335 and normally is held stationary by means of a disengaged, or blocked, back feed clutch 333 geared to gear 336 and 337. The ratio between the ring gear 319, the planet gears 314 and 315, and the sun gear 317 is such that one-third of a revolution of the ratchet wheel 307 and planetary gear carrier 311 causes the sun gear 317 to make one complete revolution in the CCW direction (FIG. 7). Since the cam 321 and stud 323 are integral with the sun gear, the cam and stud are carried one complete revolution, the peripheral surface of cam 321 engages an ear 339 on the upper end of the driver 325, forcing the driver upwardly. The ear 329 is carried thereby out of engagement with the gear 331. The lower end of the driver is formed with a slot which is pivoted about a stationary stud 341 of an eccentric adjustment arrangement, presently described, stud 341 being nearly coaxial with the sprocket shaft 195 (FIG. 5). As the cam 321 is rotated CCW, the driver 325 is not only raised by the high portion of the cam, but it is pivoted CCW about the shaft 341 by means of the stud 323 which is integral with the cam. As the high portion of the cam moves downwardly and away from the ear 339, the spring 327 pulls the 329–A, in engagement with the next tooth in the gear 331. At this point the cam has completed one-half of a revolution and continues through the remainder of the revolution with the high portion of the cam out of engagement with the ear 339. The stud 323, however, continues to be driven CCW, driving against the mating slot in the driver 325. The ear 329 is driven thereby from the position 329–A to the original position, having driven gear 331 one tooth space CW to forward feed the media one code space. The slot in driver 325 comprises an arcuate portion which is concentric to the path of the stud 323, which portion is originally adjusted to be centrally contacted by the stud when in the position shown. This permits the stud to bounce upon return to the normal position and otherwise be out of normal position without moving the driver 325.

A centralizer which comprises a lever 343, a roller 345, and a spring 347 is provided for maintaining the sprocket 115 centralized during the period that the ear 329 is out of engagement with the gear 331. The lever 343 is freely mounted on a sleeve 348 by means of a set screw 349 into the frame. The inside diameter of the sleeve is larger than the outside diameter of the set screw to permit automatic adjustment of the centralizer with respect to the gear 331. When the screw 349 is loosened, the sprocket 115 and centralizer are set to an adjusted position in which sprocket holes punched in tape or card media precisely engage the teeth of the sprocket.

Figures 7B, 7C:
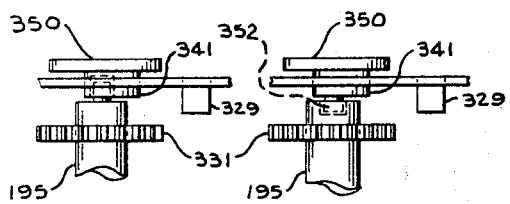
FIG. 7B is a view of an eccentric adjustment for the feed mechanism taken along lines 7B—7B of FIG. 7.
FIG. 7C is an alternate embodiment of the eccentric adjustment mechanism of FIG. 7B.

An eccentric adjustment arrangement is provided for precisely adjusting the position of the ear 329 with respect to the tooth spaces on the gear 331 after the sprocket is adjusted. A side view of the arrangement taken along lines 7B—7B is shown in FIG. 7B. The arrangement comprises an adjusting lever 350 (FIG. 7) having an arcuate slot in engagement with the set screw 349. The lever 350 is held by the screw against the sleeve 348. The screw 349 may be loosened to move the lever 350 for adjustment and then tightened to maintain the lever in the adjusted position. The stud 341 (FIG. 7B) extends downward from the lever 350 into engagement with the slot in the driver 325 to provide a pivot for the driver. A smaller stud 352, eccentric to the stud 341, extends downward into a mating hole in the center of the sprocket shaft 195.

Thus, CCW movement of the lever 350 (FIG. 7) from the centralized position shown moves the driver ear 329 leftward. Clockwise movement of the lever 350 moves the ear 329 rightward. This arrangement, with the ear 329 between two pivot joints, i.e. studs 323 and 341, permits a very fine adjustment of the ear 329 with respect to the gear 331. Such an arrangement is possible only by making the stud 341 a combined pivot and part of an eccentric adjustment. An alternate embodiment of the eccentric adjustment is shown in FIG. 7C where a stud extends upward from the center of the shaft 195 into an eccentric mating hole in the stud 341.

The feed mechanism 290 is used also to back feed the media one code space upon depression of the back feed key 132 (FIG. 1). Depression of the back feed key closes a switch 354 (FIG. 7) to the back feed solenoid 294. When the solenoid is energized, an associated armature 356 is moved out of engagement with a single tooth ratchet 357 of the back feed clutch 333. The clutch is released thereby for a full revolution in the CW direction. If, however, the back feed key 132 is not raised by the time the clutch 333 completes a half revolution, the switch 354 remains closed and the solenoid 294 remains energized. With the armature 356 actuated thereby, an arm 358 attached to the armature is CW, in the path of the single tooth on the clutch ratchet 357. Thus, the ratchet cannot complete a revolution while the key 132 remains depressed. This arrangement prevents the feed mechanism 290 from feeding the media more than one code space for each depression of the back feed key 132.

The back feed clutch 333 is identical in principle of operation to the forward feed clutch 296 (FIG. 7) discussed hereinbefore. The back feed clutch comprises the single tooth ratchet 357, in which one end of a clutch spring (not shown) is anchored, and a flanged bushing 360 in which the other end of the spring is anchored. The bushing 360 is freely mounted on the rotating shaft 235 and mates by means of a pair of teeth 361 with a bushing that is integral with the gear 337. During CW rotation of the back feed clutch 333, the ring gear 319 is driven CCW through a gear train comprising gears 337, 336, and 335. Since the planetary gear carrier 311 is held stationary by means of the armature 298 acting through the clutch 296, the sun gear 317 is driven CW through the planetary gears 314 and 315. The ratio of the gear teeth is such that one revolution of the back feed clutch 333 drives the sun gear 317 one complete revolution in the CW direction from the position shown.

During the CW revolution of the sun gear, the cam 321 and stud 323 are carried GW therewith. At the beginning of the revolution, the stud 323 drives against the slot in the driver 325, pivoting the driver CCW about the stud 341. The ear 329 is carried thereby from the position shown to the position 329–A, during which movement it is held in engagement with the gear 331 by the spring 327. The sprocket 115 (FIG. 1A) is driven thereby one tooth space in the CW direction, feeding the media one code space backward. During the second half of the revolution of the sun gear 317, the cam 321 engages the ear 339 on the driver 325 carrying the driver upward and the ear 329 out of engagement with the gear 331. The stud 323 then pivots the driver 325 CW about the stud 341. As the high portion of the cam moves away from the ear 339, the spring 327 brings the ear 329 back into engagement with the next tooth space on the gear 331.

Early models of the feed mechanism 290, wherein the punch and feed solenoids were energized simultaneously, were operated satisfactorily within the system 100 since the forward feed of drive ear 329 did not move gear 331 until after the punches were withdrawn from the punch die. In order to meet manufacturing tolerances, however, it was found necessary to delay the time at which the clutch 296 is engaged to prevent the media from being fed while the punches 114 might possibly still be engaged with the media. One mode of delay used to meet the problem was by means to retard the pulse which energizes the forward feed solenoid 292. Another mode of delay is by mechanical means such as shown in FIG. 8.

Figure 8:
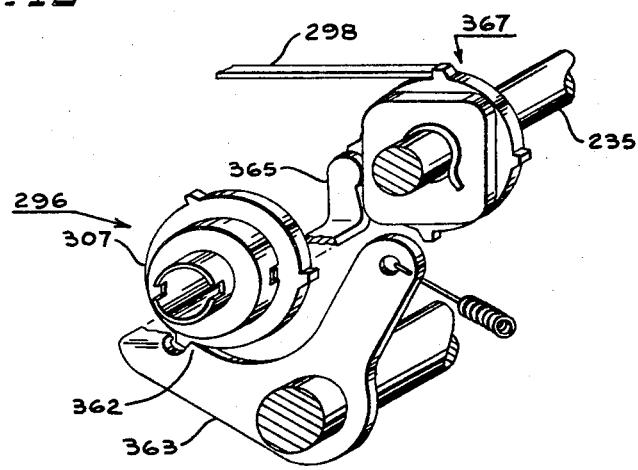
FIG. 8 is an enlarged perspective view of a delay clutch for synchronizing the feed mechanism with the punches.

In FIG. 8, the clutch 296 is shown disengaged by means of a shoulder 362 in a lever 363 which is provided in place of the armature 298 in FIG. 7. The lever 363 has a follower 365 in engagement with a cam of a clutch 367 which is of the same type as discussed hereinbefore. The clutches are freely mounted side by side on the shaft 235. The clutch 367 normally is held disengaged from the shaft 235 by the armature 298 (FIGS. 7 and 8). Upon energization of the solenoid 292, the clutch 367 is engaged with the shaft 235 for a quarter revolution CCW. Approximately midway through the quarter revolution, the follower 365 and lever 363 are driven CCW, disengaging the shoulder 362 from the ratchet 307. The clutch 296 is engaged thereby with the shaft 235 after a delayed period to actuate the feed mechanism 290. This delayed period allows sufficient time for the punches 114 to be withdrawn from the media before the media is fed.

Offset sprocket

In early models of the invention it was found that as a card such as 124 (FIG. 2) or 126 (FIG. 3) was fed forward, it had a tendency to rise from the guiding surface or deck 109, causing holes to be punched out of place on the card. Originally, the teeth of the sprocket 115 (FIG. 5) were precisely centered in the sprocket holes of the card to theoretically cause the lower edge of the card to ride on the deck 109. It proved very costly, however, to manufacture a deck 109 flat enough to prevent the cards from rising. This difficulty was overcome successfully by offsetting the sprocket teeth toward the deck 109 by a slight amount. A satisfactory offset was found to be .003 inch. Such an offset was found sufficient to cause the card to be forced against the deck 109 at all times regardless of any irregularities in the deck but was not sufficient to tear or mutilate the sprocket holes in either card or tape media.

Card lock and feed

Figure 9:
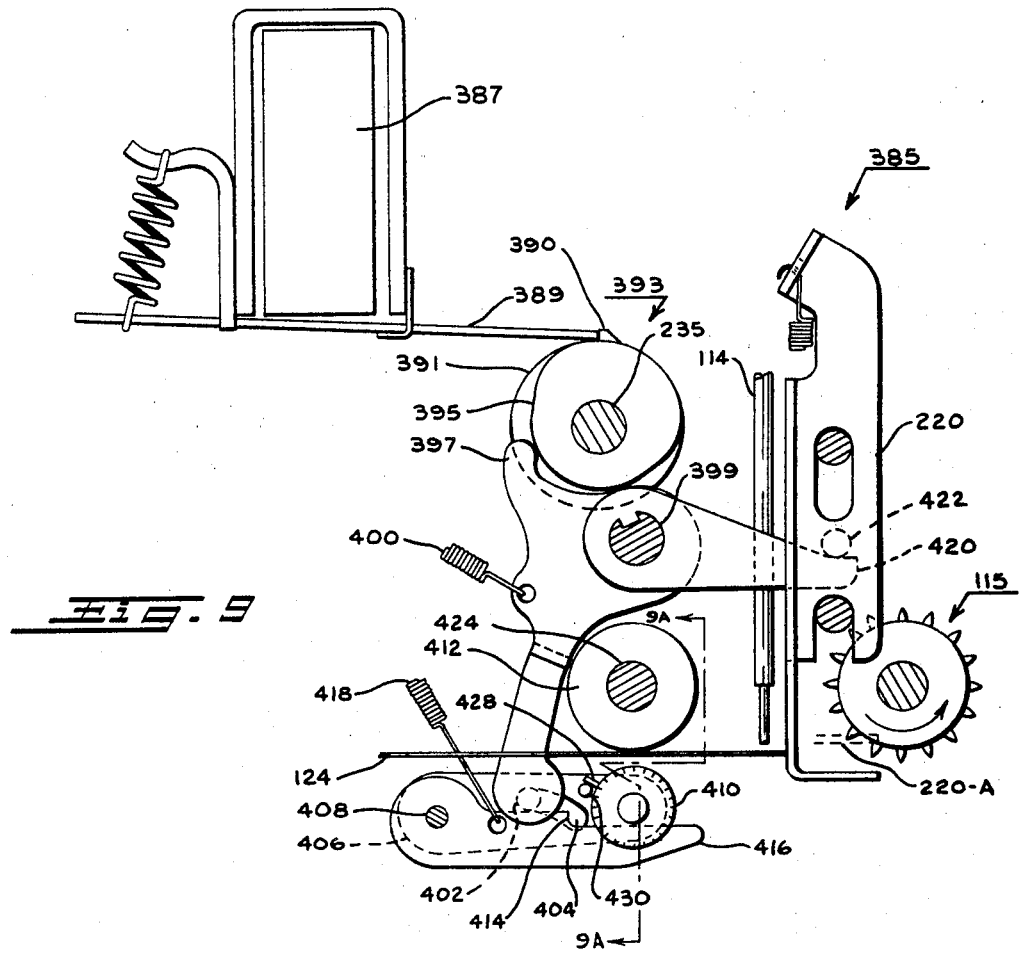
FIG. 9 is a top view of a mechanism for driving card media synchronously with punching before the media is engaged with the sprocket.

A card lock and feed mechanism 385 (FIG. 9) is provided for feeding a card forward by means of an auxiliary feeding means from an index position into engagement with the sprocket 115. The card may be either an individual card 126 (FIG. 3) or the first card of a series of fanfold cards 124 (FIG. 2), the card 124 being shown in the index position in FIG. 9. In either case, the card is inserted between the gate 113 and the front of the cabinet 102 with the lower part of the card against the deck 109 and the leading edge of the card against a slide 220 (FIGS. 6 and 9). With the card so positioned, it is ready for the first holes to be punched by the punches 114. As shown in FIG. 9, the sprocket 115 is some distance rightward from the leading edge of the card 124 so that the card is not ready to engage the sprocket even after one or two holes are punched into the card. In order to feed the card rightward far enough for engagement of the card with the sprocket to permit the sprocket to drive the card after the first few holes are punched, the card lock and feed mechanism 385 must first be actuated.

After the card is indexed, but before the punches are actuated, the card lock key 136 (FIG. 1) is depressed. A card lock solenoid 387 is energized thereby, causing an associated armature 389 to pivot CCW. Normally, the armature 389 is engaged with a single tooth 390 of a ratchet 391. The ratchet 391 is part of a clutch 393 that is mounted on the continuously rotated shaft 235. A cam 395 is assembled into the clutch so that upon disengagement of the armature 389 with the tooth 390, the cam 395 is driven CCW. A follower 397 is keyed to a shaft 399 and is urged CW by means of a spring 400 into engagement with the cam 395. A stud 402 extends from a lower end of the follower 397 into engagement with a camming slot 404 in a cam lever 406, the cam lever being freely mounted on a frame shaft 408. When the cam 395 is driven CCW, the stud 402 is forced CCW in the camming slot 404, forcing the cam lever 406 CCW. A knurled pinch roller 410 is mounted on the end of the lever 406 and is carried therewith firmly against the card 124. The card 124 is held tightly thereby between a pinch roller 412 and the knurled roller 410. When the stud 402 is carried fully CCW, it is in a position to the right of a shoulder 414 in a latch 416 also freely mounted on the shaft 408. A spring 418 urges the latch 416 CCW so that when the stud 402 is rightward of the shoulder 414 the latch 416 is moved slightly CCW by the spring 418, bringing the shoulder 414 to the left of the stud 402. The follower 397 is prevented thereby from being returned by the spring 400 to the position shown. With the follower 397 fully CCW, the knurled pinch roller 410 is locked in a position to hold the card 124 between the pinch rollers 410 and 412.

When the follower 397 is rocked CCW by the cam 395 as discussed above, the follower rocks the shaft 399 CCW, carrying a lever 420, also keyed to the shaft 399, CCW therewith. The right end of the lever 420 is driven against a stud 422 extending downward from the card stop slide 220 (as seen in the top view—FIG. 9) driving the slide rearward and clear of the card 124 to a position 220-A.

With the card 124 locked between the pinch rollers 410 and 412, the system 100 (FIG. 1) is ready to punch data received from the data source 103. Upon receiving such data, punching is commenced and the sprocket wheel is driven in the manner discussed hereinbefore. The pinch roller 412 is the same diameter as the sprocket disk 196 and is integral with a shaft 424 to which a gear 426 (FIG. 7) is keyed. The gear 426 is driven at a one to one ratio by means of the idler gear 286 which in turn is driven by the gear 288 which is fixed to the shaft 195. Since shaft 195 and the sprocket 115 are driven also by means of the gear 331, the pinch roller is advanced one code space each time the sprocket 115 is driven. The card 124 is driven by means of the pinch roller 412 until the card is far enough rightward for the sprocket holes to engage the sprocket, at which time the knurled pinch roller 410 is disengaged from the card.

Figure 9A:
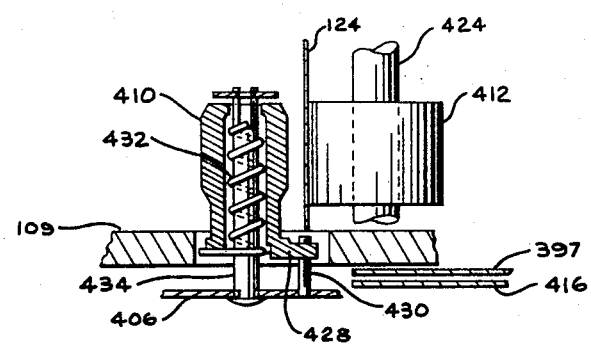
FIG. 9A is a sectional view taken along lines 9A—9A of FIG. 9 of pinch rollers used to drive card media from the index position into engagement with the sprocket.

Such disengagement is caused by means of a protrusion 428 which extends from the lower end of the roller 410 (FIGS. 9 and 9A). Normally, the protrusion 428 rests against a stud 430 extending upward from the cam 406. Each time the card 124 is advanced rightward, however, the roller 410 is rotated CW, carrying the protrusion 428 CW therewith. After engagement of the sprocket holes with the sprocket 115, the protrusion 428 is in a position to engage the latch 416. Further rightward advance of the card 124 and CW rotation of the roller 410 drives the protrusion 428 against the latch 416, forcing the latch CW. This movement of the latch 416 lowers the shoulder 414 away from the stud 402 on the follower 397, permitting the spring 400 to rock the follower CW to the position shown. As the follower 397 is rocked CW, the cam lever 406 is cammed CW by means of the stud 402, carrying the knurled pinch roller 410 away from the card 124. The card is released thereby from engagement with the rollers 410 and 412 and thereafter is driven solely by the sprocket 115.

Upon disengagement of the roller 410 with the card, the roller is restored to the position shown by means of a spring 432 (FIG. 9A). The spring 432 is mounted on a stud 434 extending upward from the cam lever 406. The spring 432 is wound about the stud 434 and is internal to the roller 410, shown cut away in FIG. 9A. The upper end of the spring 432 is anchored in a slotted upper end of the stud 434, while the lower end of the spring is anchored in a slot in the lower end of the roller 410. Thus, the spring 432 urges the roller 410 CCW (FIG. 9). When the roller 410 is engaged with the card 124, the spring 432 is driven somewhat tighter upon advancement of the card so that upon disengagement of the roller with the card, the roller is free to rotate CCW to the position shown with the protrusion 428 against the stud 430.

*Solenoid and feed circuit*

The punches 114 (FIG. 1A) may be actuated for punching either tape 108 (FIG. 1), cards 124 (FIG. 2) or 126 (FIG. 3) in response to data in the form of coded electrical signals received from a data source such as the data processing system 103 (FIG. 1). The data processing system 103 is of the type in which the coded electrical signals successively appear in parallel channels at the output of the system.

The forward feed solenoid 292 (FIG. 7) is energized each time a strobe signal is applied, causing the media to be fed one code space forward in the manner discussed hereinbefore.

A sprocket hole punching solenoid (not shown herein) is associated with a clutch and punch similar to punch 114 (FIG. 2). The sprocket punch, however, is slightly smaller than the punches 114. The two-position sprocket hole key 134 (FIG. 1) is provided to operate a switch so that the sprocket solenoid is energized whenever a strobe signal is applied to punch a sprocket hole in the media.

The forward feed key 128 (FIG. 1) is provided for controlling forward feeding of the tape 108, fanfold cards 124 (FIG. 2) or single cards 126 (FIG. 3) as long as the key is held down. In the case of a single card or fanfold card, however, a single depression of the forward feed key 128 merely causes the feed mechanism 290 (FIG. 7) to automatically feed a single card until the trailing end of the card is sensed by the sensing lever 478 (FIG. 6) or to feed fanfold cards until the index hole 130 in the next card is sensed by a hole sensing lever 478. In the case of single cards, several code spaces remain for punching when the trailing edge of the card is sensed and the card may be advanced to the end by holding the feed key down. In the case of fanfold cards, the next card is in a position for punching in the first code space when the hole 130 is sensed. Whenever the forward feed key 128 is depressed, one or more strobe signals are produced and cause the feed mechanism 290 (FIG. 7) to forward feed the media in the manner discussed hereinbefore. Normally, however, the forward feed key stands in raised position so that strobe signals are available only from the strobe circuit.

When the system 100 is operated with fanfold cards 124, momentary depression of the forward feed key 128 causes the card to be automatically fed forward until the next card is in position. Such automatic feed control is by means of the hole sensing switch 470 (FIG. 6). With tape in the system 100, for example, the lever 478 is clear of the tape and therefore remains closed. Insertion of the first of a series of fanfold cards 124 to the index position as shown in FIG. 6 positions a sensing hole 130 opposite the hole sensing lever 478. With the card in the index position therefore, the switch 470 remains closed.

The invention claimed is:

1. In a machine utilizing a length of tape on which information is to be recorded, having:
 (a) a reel for receiving the tape;
 (b) means for feeding said tape in a forward direction to said reel;
 (c) means for normally driving said reel to take up said tape faster than the tape is fed by said feeding means;
 (d) control means engaged with said tape and normally in a control condition responsive to a tension of said tape to disable said driving means to thereby permit said feeding means to feed said tape and relieve the tension, characterized by the control means comprising a tape path lengthening and shortening means and said feeding means being operable to feed said tape in a backward direction opposite to said forward direction whereupon the tape is tensed to cause said control means to disable said driving means, said control means being movable by said tensed tape in a tape path shortening direction to permit a substantial number of backspaces.

2. In a machine according to claim 1 wherein said control means may be manually moved to a stable position to disable said driving means.

3. In a punching device for punching holes in tape and card media, the combination of:
 (a) means for driving said media;
 (b) a gate held adjacent said driving means;
 (c) first means carried by said gate for guiding said tape media in a first path in arcuate engagement with said driving means; and
 (d) second means carried by said gate and adjacent said first means for moving said first means, in the absence of said tape media, to a position to permit said second means to guide said card media in a second path in tangential engagement with said driving means.

4. In a punching device for punching holes in tape and card media, the combination of:
 (a) a sprocket for driving said media, said sprocket comprising a body with sprocket teeth extending therefrom into engagement with mating punched holes in one of said media;
 (b) a plurality of grooves in said body;
 (c) a gate held adjacent said sprocket;
 (d) a tape pressure guide carried by said gate and having fingers extending therefrom for holding said tape media in arcuate engagement with said sprocket body and said sprocket teeth; and
 (e) spring member carried by said gate said member being flared to receive card media between said spring and tape pressure guide, said tape pressure guide fingers entering said grooves in the sprocket body to permit the card to tangentially engage said body and sprocket teeth.

5. In a punching device according to claim 4 wherein said tape pressure guide, including said fingers comprises an inner surface that engages the tape and holds the tape in arcuate engagement with said sprocket, and which guide further comprises an outer surface which, in the absence of tape, is tangential to said sprocket with said fingers entering said grooves.

6. In a card handling device wherein a card having sprocket holes is driven from one location to another, the combination of:
 (a) a sprocket with teeth extending therefrom for engagement with said sprocket holes in the card;
 (b) means for driving said sprocket to move the card from one location to another;
 (c) a guiding surface in engagement with one edge of the card to guide the card in the direction of said movement; and
 (d) means for maintaining said sprocket offset from the precise center of said sprocket holes towards said guiding surface, said offset sprocket causing said teeth to engage the edge of the sprocket holes to force the card against the guiding surface.

7. A card handling device according to claim 6 wherein said sprocket comprises a single set of teeth.

8. A card handling device according to claim 6 wherein the offset of said sprocket teeth from the center of said sprocket holes is 0.003 inch.

9. In a card punching system having a punching station for punching holes in a card, said card normally being fed from one code position to another by means of a main feeding means which comprises a sprocket engaged with sprocket holes in the card, the combination of:
 (a) means for indexing said card with respect to said punching station wherein the card sprocket holes are not engaged with the sprocket;
 (b) an armature;

(c) a clutch normally held disengaged from a source of power by means of said armature;
(d) a solenoid;
(e) means for energizing said solenoid to move said armature away from said clutch to permit said clutch to engage with said source of power;
(f) cam means integral with said clutch and driven therewith by said source of power;
(g) a follower-lever mechanism engaged with said cam and driven thereby;
(h) an auxiliary feeding means connected to said main feeding means and actuated thereby; and
(i) card locking means mounted on said mechanism and carried thereby, upon engagement of said clutch, against said card to hold the card in locking engagement with the auxiliary feeding means to feed said card forward from said index position to a position of engagement with said sprocket.

10. A card punching system according to claim 9 wherein said indexing means blocks said card in said index position, comprising: means engaged with said follower-lever mechanism and said indexing means to move and maintain said indexing means clear of said card.

11. In a card punching system according to claim 9, comprising means operable by said auxiliary feeding means to release said card locking means from engagement with said card upon predetermined movement of the card to a position of engagement with said sprocket.

12. In a card punching system having a punching station for punching holes in a card, said card normally being fed from one code position to another by means of a main feeding means comprising a sprocket engaged with sprocket holes in the card, the combination of:
(a) means for indexing said card with respect to said punching station;
(b) an armature;
(c) a source of power;
(d) a clutch normally held disengaged from said source of power by means of said armature;
(e) a solenoid;
(f) means for energizing said solenoid to move said armature away from said clutch to permit said clutch to engage with said source of power;
(g) cam means integral with said clutch and driven therewith by said source of power;
(h) a follower normally engaged with said cam;
(i) a cam lever engaged with said follower and operated thereby;
(j) a roller mounted on said cam lever and carried thereby, against said card upon actuation of said follower by said cam;
(k) a latch operable upon movement of said roller against said card to latch said follower and lock said roller in position against said card;
(l) an auxiliary feeding means connected to said main feeding means and actuated thereby, said auxiliary means being positioned opposite said roller to hold said card therebetween upon movement of said roller against said card;
(m) means for actuating said main feeding means and thereby said auxiliary feeding means to move said card from said index position to a position of engagement with said sprocket, said roller rotating away from an initial position during movement of said card;
(n) an ear extending from said roller, said ear being rotated from said initial position to a position against said latch to drive said latch from engagement with said follower upon predetermined movement of said card to a position of engagement with said sprocket, said follower being released thereby from engagement with said latch to permit the roller to move away from said card, thereby releasing said card from said auxiliary driving means, 13. In a card punching machine comprising means located at a punching station for punching data representing holes in a series of cards attached to one another, the combination of:
(a) a feed key;
(b) an index representation on each of said cards;
(c) means for sensing said index representation when a card is in an index position relative to the punching station;
(d) feed means responsive to depression of said feed key to continuously feed said cards; and
(e) means responsive to a sensing of an index representation by said sensing means to automatically stop the operation of said feed means.

14. In a card punching machine according to claim 13 wherein said feed means is responsive to depression of said feed key to continuously feed said cards past said punching station and said sensing means as long as said feed key is held depressed.

15. In a card punching machine according to claim 14 which is adaptable to receive and punch tape, wherein said feed means is operable upon depression of said feed key to feed said tape as long as the feed key is held depressed.

References Cited

UNITED STATES PATENTS

| | | | |
|---|---|---|---|
| 400,998 | 4/1889 | Bill | 242—75.5 |
| 2,017,655 | 10/1935 | Decker | 242—75.5 X |

EDWARD A. SROKA, *Primary Examiner.*